US009698679B2

United States Patent
Jessenig et al.

(10) Patent No.: US 9,698,679 B2
(45) Date of Patent: Jul. 4, 2017

(54) CIRCUIT FOR DC-DC CONVERSION WITH CURRENT LIMITATION

(71) Applicant: ams AG, Unterpremstätten (AT)

(72) Inventors: Thomas Jessenig, Graz (AT); Manfred Lueger, Preding (AT); Christian Halper, Olbendorf (AT); Peter Bliem, Graz (AT)

(73) Assignee: AMS AG, Unterpremstaetten (AT)

( * ) Notice: Subject to any disclaimer, the term of this patent is extended or adjusted under 35 U.S.C. 154(b) by 37 days.

(21) Appl. No.: 14/356,587

(22) PCT Filed: Oct. 19, 2012

(86) PCT No.: PCT/EP2012/070765
§ 371 (c)(1),
(2) Date: May 6, 2014

(87) PCT Pub. No.: WO2013/068226
PCT Pub. Date: May 16, 2013

(65) Prior Publication Data
US 2014/0285174 A1    Sep. 25, 2014

(30) Foreign Application Priority Data

Nov. 7, 2011 (DE) .................. 10 2011 117 814

(51) Int. Cl.
*H02M 3/156* (2006.01)
*H02M 1/32* (2007.01)
(Continued)

(52) U.S. Cl.
CPC .............. *H02M 3/156* (2013.01); *H02M 1/32* (2013.01); *H02M 3/158* (2013.01); *H02M 3/1588* (2013.01); *H02M 2001/0019* (2013.01)

(58) Field of Classification Search
CPC .......... H02M 2001/0019; H02M 1/32; H02M 3/156; H02M 3/158; H02M 3/1588
See application file for complete search history.

(56) References Cited

U.S. PATENT DOCUMENTS 6,111,606 A * 8/2000 Ikeda ................... H04N 5/3575
327/552
7,518,348 B1   4/2009 Kobayashi
(Continued)

FOREIGN PATENT DOCUMENTS

EP       1850468 A2    10/2007

OTHER PUBLICATIONS

Lee, Cheung Fai et al., "A Monolithic Current-Mode CMOS DC-DC Converter With On-Chip Current-Sensing Technique", IEEE Journal of Solid-State Circuits, vol. 39, No. 1, Jan. 2004, pp. 3-14.

*Primary Examiner* — Fred E Finch, III
*Assistant Examiner* — Raphael O De Leon Domenech
(74) *Attorney, Agent, or Firm* — McDermott Will & Emery LLP

(57) ABSTRACT

A circuit for DC-DC conversion with current limitation comprises a DC-DC converter (100) with a coil (110) and a controllable switch (120) that can be switched into a low-impedance and a high-impedance state, and a current limiter (300a, 300b) for generating a control signal ($I_{OC}$) for controlling the state of the controllable switch in the DC-DC converter (100). The current limiter (300a, 300b) is constructed such that the current ($I_L$) through the coil at which the current limitation takes place is nearly independent of the ratio of the on-times and off-times of the controllable switch in the DC-DC converter (100).

11 Claims, 4 Drawing Sheets

Figure 5:
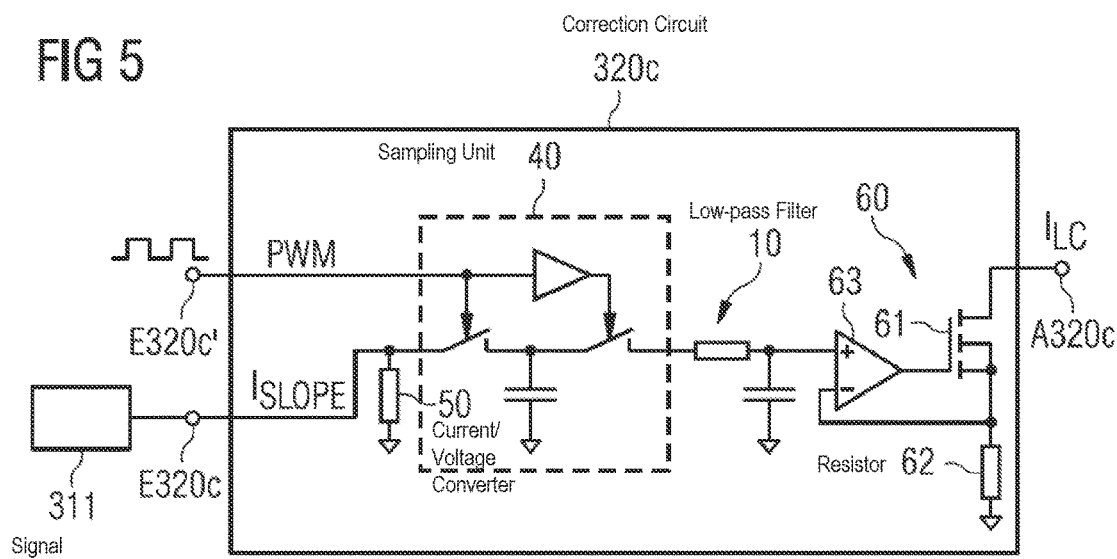

(51) Int. Cl.
  *H02M 1/00* (2006.01)
  *H02M 3/158* (2006.01)

(56) References Cited

U.S. PATENT DOCUMENTS

| | | |
|---|---|---|
| 2007/0252567 A1 | 11/2007 | Dearn et al. |
| 2010/0079127 A1 | 4/2010 | Grant |
| 2010/0253309 A1 | 10/2010 | Xi et al. |
| 2011/0006744 A1 | 1/2011 | Dearborn |
| 2011/0062932 A1 | 3/2011 | Hawkes |

* cited by examiner

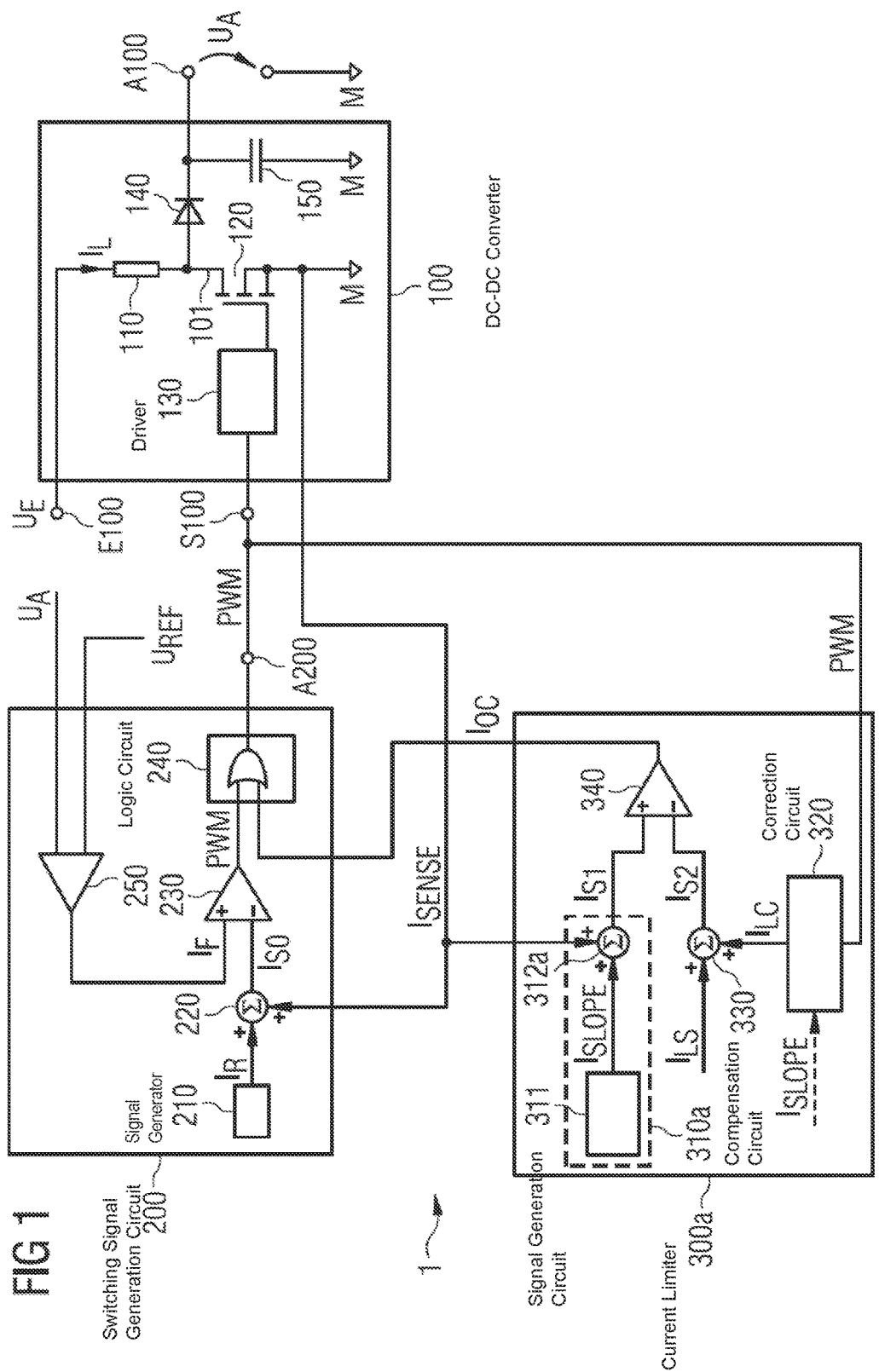

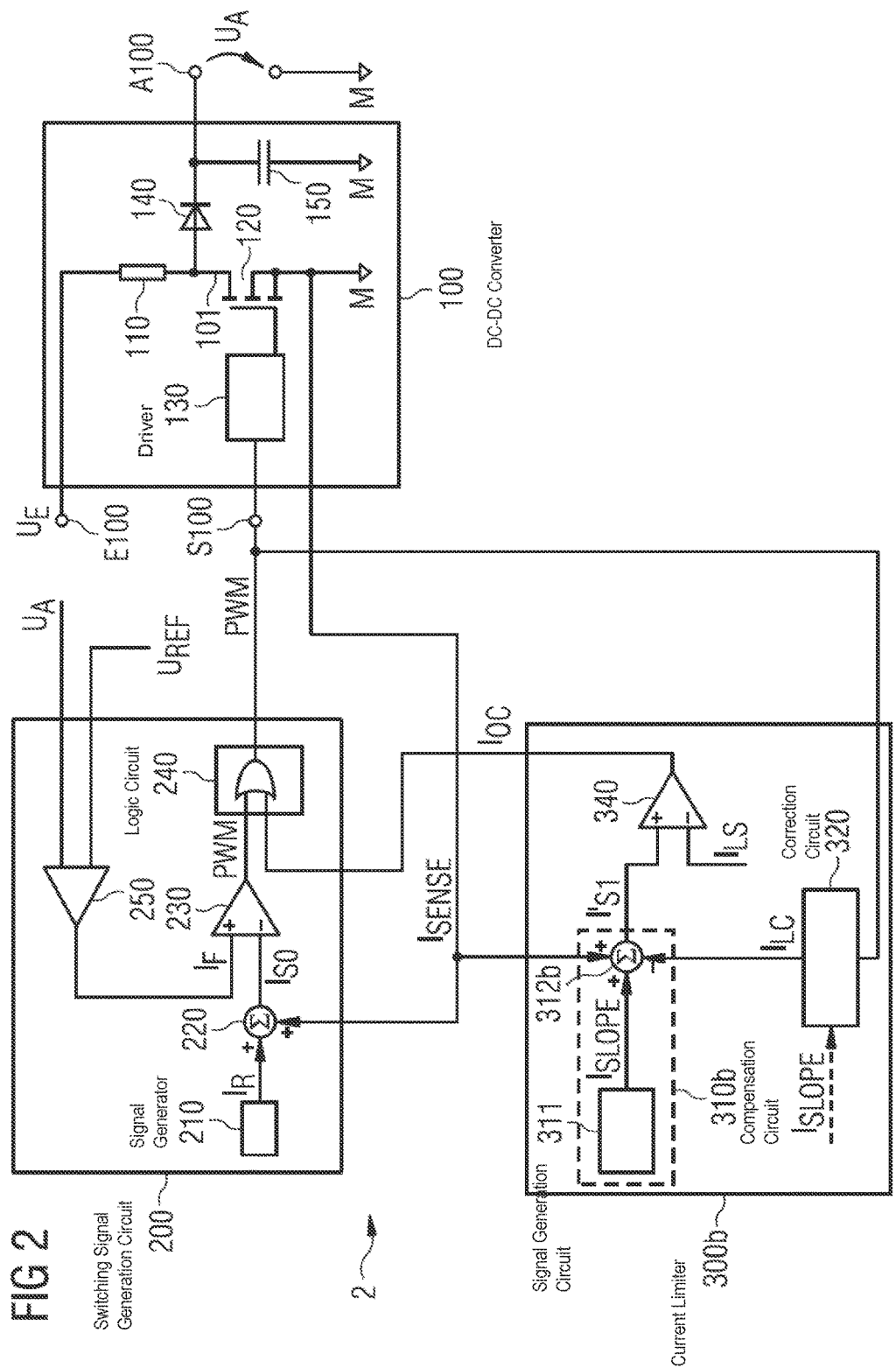

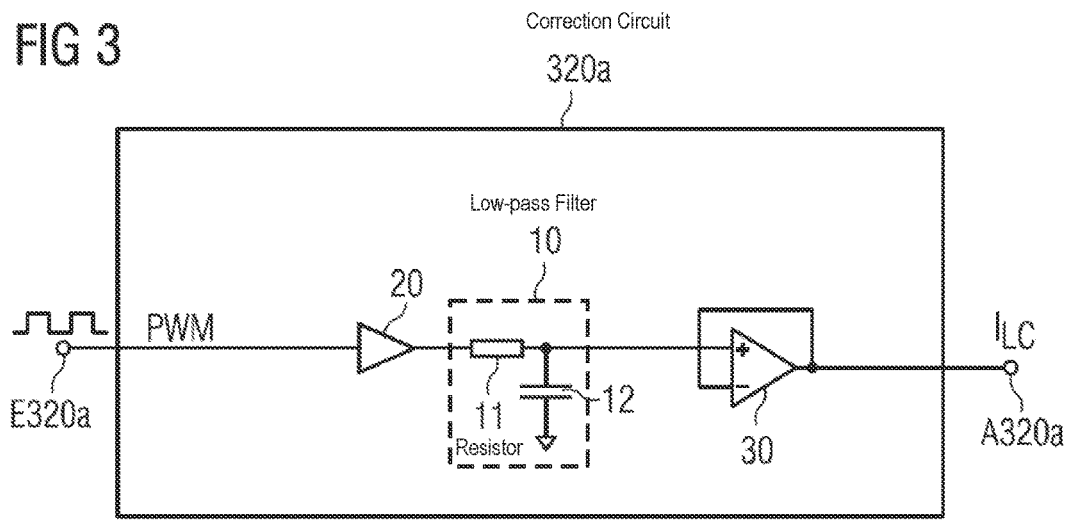
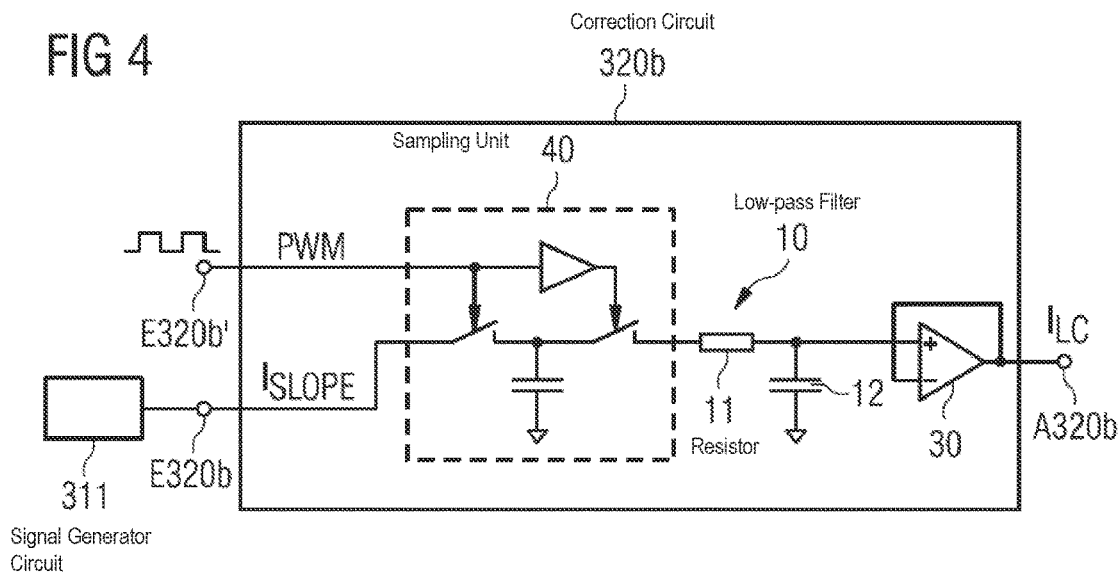

CIRCUIT FOR DC-DC CONVERSION WITH CURRENT LIMITATION

The invention relates to a circuit for DC-DC conversion with current limitation, in which a level of a coil current of a DC-DC converter is limited.

A DC-DC converter converts the level of an input voltage into a higher or a lower level of an output voltage, depending on whether the DC-DC converter is realized as a boost converter or a buck converter. A DC-DC converter has a coil for example, which is connected to a controllable switch. In order to operate the DC-DC converter, the controllable switch can be driven with a switching signal into the conductive or into blocking state, whereby a current through the coil is switched on or off.

To prevent damage to the DC-DC converter, it is necessary to limit the peak current through the coil to a predetermined value. Current limitation is activated if an excessively high load on the DC-DC converter draws too much current for example, or if an output load in an application of the circuit transiently draws too much current.

In order to limit the coil current, the instantaneously flowing coil current can be measured in a simple controller and compared to a threshold value. Based on the comparison, the controllable switch then switches the coil current on or off.

In order to stabilize such a controller, and particularly in order to prevent the appearance of subharmonic oscillations, an edge or ramp compensation circuit (slope compensation) can be provided in the controller. The slope compensation circuit is intended to guarantee stable operation when the coil current is limited.

Slope compensation as part of the simple control has the consequence, however, that the level of the coil current at which the control circuit limits the coil current is dependent on the ratio of the time duration of the on and off pulses (duty cycle) of the switching signal. The level of the peak current at which the current limitation begins is therefore not constant, but can instead be directly proportional to the length of the on and off intervals with which the controllable switch is switched between the lower impedance and the higher impedance states. With an increasing on/off time ratio of the controllable switch (high duty cycle), a load connected to the DC-DC converter requires more and more energy, while on the other hand, the peak current through the coil is limited based on the slope compensation to smaller and smaller values.

It is desirable to specify a circuit for DC-DC conversion with current limitation in which the current limitation is as largely independent as possible on the on/off times of the switching signal for controlling a controllable switch of a DC-DC converter.

In one embodiment, a circuit for DC-DC conversion with current limitation comprises: a DC-DC converter with a coil and a controllable switch that can be switched into a first and a second state, the controllable switch having a higher impedance in the second state than in the first state; a switching signal generation circuit for generating a switching signal for switching the controllable switch; and a current limiter for generating a control signal for controlling the switching signal generation circuit. The switching signal generation circuit is designed to generate, based on the level of the control signal, a periodic sequence of the switching signal that switches the controllable switch into the first and second state during a period duration of the switching signal, or to generate the switching signal such that the controllable switch is switched to the second state during the period duration of the switching signal. The current limiter further comprises a signal generator circuit for generating a periodic signal and a correction circuit for generating a correction signal. A measurement signal, the level of which is dependent on the magnitude of the current through the coil, can be supplied to the current limiter. The current limiter is designed to form a sum from a level of the periodic signal and a level of the measurement signal. The correction circuit generates the correction signal on the basis of the periodic signal or the switching signal. The current limiter generates the control signal on the basis of the correction signal and the sum.

The switching signal generation circuit can be constructed as a pulse-width modulator, for example. The switching signal generated by the pulse-width modulator is a pulse-width modulated signal in this design. Based on the output signal of the DC-DC converter, an output voltage, for example, the switching signal generation circuit, generates the switching signal as a periodic sequence of square wave signals with different ratios of a high-level to a low-level during a period duration, so that the DC-DC converter produces a constant output voltage.

For generating the periodic sequence of the switching signal, the switching signal generation circuit can comprise, for example, a signal generator circuit for generating a ramp-shaped periodic signal, e.g. a periodic sawtooth signal. If the level of the ramp-shaped periodic signal is above a threshold value, for example, the switching signal changes its state, so that the controllable switch of the DC-DC converter is controlled to shift from a lower-impedance state into a higher-impedance state. To stabilize the regulation of the coil current to a target value, a measurement signal that is dependent on the value of the coil current can also be fed back to the switching signal generation circuit.

The current limiter is designed to limit the coil current to a predetermined value. For this purpose, the actual coil current of the DC-DC converter can be compared in the current limiter to a threshold value of the coil current. For example, the coil current is measured, and the measurement signal, the value of which depends on the measured coil current, is generated on the basis of the coil current. The measurement signal is supplied to the current limiter. On the basis of the comparison between the measurement signal and the threshold value, a level of the control signal is generated by the current limiter. If the actual coil current is below the threshold value, the control signal is generated in such a manner that the switching signal generation circuit generates a periodic sequence of the switching signal in which the controllable switch is switched between the first and second states within one period. The duty cycle of the switching signal is adjusted by the switching signal generation circuit depending on the output voltage and the coil current of the DC-DC converter.

To prevent subharmonic oscillations, that is to say fluctuations of the switching signal between high-end low ratios of the on/off times of successive time periods, the current limiter has a slope compensation circuit. The slope compensation circuit can comprise the signal generator circuit and a summation circuit, for example. The signal generator circuit generates a periodic signal that has a rising and falling edge within one period. The edge of the periodic signal can rise linearly, quadratically or exponentially, and can fall linearly, quadratically or exponentially. For example, the signal generator can produce ramp-shaped signals, particularly sawtooth signals. The periodic signal of the slope compensation circuit can correspond, for example, to the periodic signal of the switching signal generation circuit.

The summation circuit in the slope compensation circuit determines a sum from the periodic signal and the measurement signal and generates a sum signal depending on the determined sum. The sum signal can be compared to a reference value representing a threshold value of the coil current. If the reference value is exceeded, the control signal is generated by the current limiter at a level that has the effect that the switching signal generation circuit in turn generates the switching signal at a level such that the controllable switch is switched to the second state at least during one period duration of the switching signal, and therefore the coil current is limited.

If the periodic signal of the slope compensation circuit corresponds to the periodic signal of the switching signal generation circuit, the regulation has the effect, however, that with an increasing ratio of the on-time to the off-time of the switching signal during one period duration, and thus at higher values of the duty cycle of the switching signal, the control signal for controlling the switching signal generation circuit is generated even for smaller and smaller levels of the actual coil current at a level that interrupts the generation of the periodic sequence of switching signals and instead controls the controllable switch so as to be high-impedance during at least one entire period of the switching signal. With an increasing duty cycle of the switching signal, the current limitation thus begins at a lower and lower level of the coil current.

The current limiter has a correction circuit in order to reduce the dependence of the coil current at which a current limitation takes place on the duty cycle of the switching signal. The correction circuit can generate a level of the correction signal based on the switching signal, for example, on the basis of the mean value that the level of the switching signal has over a number of periods. Alternatively, the correction circuit can generate the correction signal depending on a sampling of the periodic signal of the slope compensation circuit. The current limiter generates a control signal for controlling the switching signal generation circuit as a function of the sum formed from the periodic signal, the measurement signal, a predetermined reference signal, the level of which can indicate a threshold value of the coil current, and the correction signal.

If the actual coil current is below a threshold value of the coil current, the current limiter generates the control signal at a first level. The first level has the effect that the switching signal generation circuit generates the periodic sequence of the switching signal such that the controllable switch in the DC-DC converter is switched off and on during at least one period of the switching signal. In the case of a boost converter, the coil is connected with a high impedance to the reference voltage terminal of the DC-DC converter in the switched-off state or the high-impedance state of the controllable switch. In the switched-on or low-impedance state of the controllable switch, the coil is connected with a low impedance to the reference voltage terminal.

On the other hand, if the actual coil current is above the threshold value, the current limiter generates the control signal at the second level. The second level of the control signal has the effect that the switching signal generation circuit generates the switching signal with a state during the period duration of the switching signal such that the controllable switch switches the DC-DC converter into the switched-off or second state.

Because of the calculation and consideration of the correction signal in the current limiter, the value of the coil current at which current limitation begins is nearly independent of the ratio of on/off times of the controllable switch for the DC-DC converter during a period duration of the switching signal, and thus nearly independent of the switching signal duty cycle. Particularly if the duty cycle of a pulse width modulated switching signal for controlling the controllable switch in the DC-DC converter changes, there is a smaller dependence of the peak value level of the coil current that results in a current limitation by blocking the controllable switch on the duty cycle of the switching signal.

Because the level of the coil current at which the current limitation begins is nearly independent of the switching signal duty cycle of the switching signal generation circuit, the circuit has a lower required test complexity for testing its function. In particular, it is not necessary to test the current limitation at a defined duty cycle.

In addition, higher output powers can be achieved with the circuit. The higher output powers can be achieved particularly for a high duty cycle of the switching signal, at which a boost DC-DC converter typically requires more energy, which is transmitted from the input to the output of the DC-DC converter.

Figure 6:
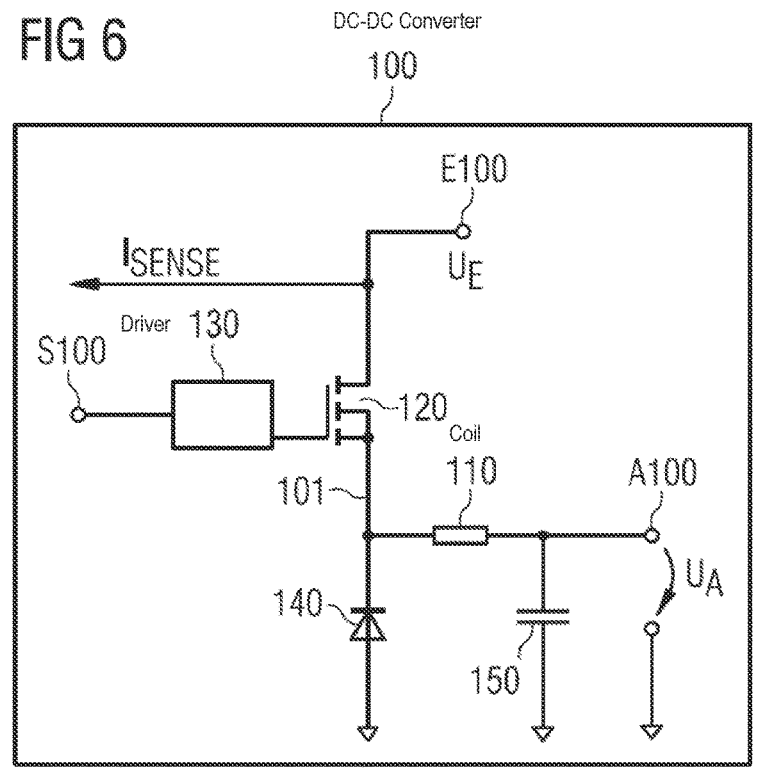

Embodiments of the circuit for DC-DC conversion with current limitation will be explained in detail below with reference to figures that show embodiments of the circuit for DC-DC conversion with current limitation. In the drawing:

FIG. 1 shows an embodiment of a circuit for DC-DC conversion with current limitation, FIG. 2 shows another embodiment of a circuit for DC-DC conversion with current limitation, FIG. 3 shows an embodiment of a correction circuit for generating a correction signal on the basis of a switching signal, FIG. 4 shows an embodiment of a correction circuit for generating a correction signal with evaluation of a periodic signal of a slope compensation circuit, FIG. 5 shows another embodiment of a correction circuit for evaluating a periodic input signal of an edge compensation circuit generated by an edge compensation circuit, and FIG. 6 shows an embodiment of a buck converter.

FIGS. 1 and 2 show different embodiments of circuits for DC-DC conversion with current limitation, each having a DC-DC converter 100, a switching signal generation circuit 200 and a current limiter 300. The two embodiments differ in the design of the current limiter circuit 300.

The DC-DC converter 100 can be implemented as a boost or a buck converter, which produces an output voltage $U_A$ at an output terminal A100 when an input voltage $U_E$ is applied to an input terminal E100. The DC-DC converter 100 of embodiments 1 and 2 can comprise, for example, a current path 101 that is inserted between an input terminal E100 for application of a DC voltage and a reference voltage terminal M for application of a reference voltage such as a ground potential. A coil 110 and a controllable switch 120 are connected in series in the current path 101 between the terminal for application of the input voltage $U_E$ and the reference voltage terminal M. The controllable switch 120 can be embodied as a transistor, for example. The controllable switch can be switched into a first, low-impedance state, in which the controllable switch is closed, or controlled to conduct, and into a second, high-impedance state in which the controllable switch is opened or controlled to block. In the embodiment of the boost converter shown in FIG. 1, the controllable switch 120 connects the coil 110 to the reference potential terminal M with a lower impedance in the first state than in the second state.

A control terminal S100 of the DC-DC converter for application of a switching signal PWM for switching the controllable switch 120 into the first and second states is connected via a driver 130 to a control terminal of the controllable switch 120. The output terminal A100 of the DC-DC converter is connected via a switched transistor or a diode 140 to the signal path 101. The diode is inserted in this case between the coil 110 and the controllable switch 120. A capacitor 150 is connected to ground between the diode 140 and the output terminal A100.

The DC-DC converter circuit 100 is constructed as a boost converter in the embodiments shown in FIGS. 1 and 2. The circuit for DC-DC conversion shown in FIGS. 1 and 2 is not limited to a boost converter, however. The DC-DC converter circuit 100 can be implemented as a buck converter, for example. One possible embodiment of a buck converter is shown in FIG. 6.

In embodiments 1 and 2 of the circuit for DC-DC conversion current limitation, the switching signal generation circuit 200 is provided for generating the switching signal PWM to control the controllable switch 120 to assume the conductive and blocking states. The switching signal generation circuit 200 comprises a signal generator 210 for generating a periodic signal $I_R$. The signal generator 210 is coupled to a summation circuit 220, whereby the periodic signal can be supplied on the input side to the summation circuit 220. In addition, a measurement signal $I_{SENSE}$, the level of which is dependent on a current $I_L$ through the coil 110, is also supplied to the summation circuit 220.

The current through the coil that flows to the reference potential terminal can be tapped as a measurement signal $I_{SENSE}$ directly at the coil itself or from the current path 101. Alternatively, a circuit that measures the current $I_L$ and generates the measurement signal $I_{SENSE}$ based on the measured coil current $I_L$ can be inserted between the controllable switch 120 and the reference potential terminal M. On the output side, the summation circuit 220 generates a sum signal $I_{S0}$, which indicates the sum of the periodic signal $I_R$ and the measurement signal $I_{SENSE}$.

The signal generation circuit 200 comprises a comparator circuit 250 that compares the output voltage $U_A$ generated by the DC-DC converter 100 to a reference voltage $U_{REF}$. Depending on the comparison, the comparator circuit 250 generates a comparison signal $I_F$ at its output. The switching signal generation circuit 200 further comprises a comparator circuit 230, which compares the sum signal $I_{S0}$ to the comparison signal $I_F$. For this purpose, the comparator circuit 230 is coupled on the input side to an output of the comparator circuit 250 and to the signal generator 210. Based on the comparison of the sum signal $I_{S0}$ to the comparison signal $I_F$, the comparator circuit 230 generates the switching signal PWM at the output side.

The switching signal generation circuit 200 further comprises a logic circuit 240, which is connected at an input side to an output side of the comparator circuit 230 and at another input side to the current limiter circuit 300. The logic circuit can contain a flip-flop circuit. The switching signal PWM and a control signal $I_{OC}$ generated by the current limiter are fed to the logic circuit on the input side. The logic circuit evaluates the state of the control signal $I_{OC}$ and, based on the state of the control signal $I_{OC}$, generates, at an output terminal A200 of the switching signal generation circuit 200, the switching signal PWM for controlling the controllable switch 120 of the DC-DC converter.

If the control signal $I_{OC}$ has a first state, for example, the switching signal generation circuit 200 generates a periodic sequence of the switching signal PWM during a time wherein the controllable switch 120 is switched into the first and second states during a period duration of the switching signal PWM. If the control signal $I_{OC}$ has a second state, for example, the switching signal generation circuit generates the switching signal PWM during the period duration of the switching signal in such a manner that the controllable switch is switched into the second state during the entire period duration of the switching signal.

The switching signal generation circuit 200 for generating the switching signal PWM can be constructed as a pulse-width modulator. In this case, the switching signal PWM is a pulse-width modulated signal. For example, the switching signal PWM can be a square wave signal, which has a high and a low pulse in one period of the switching signal. In order to generate the switching signal PWM, the comparison signal $I_F$ is compared by the comparator circuit 230 to the summation signal $I_{S0}$. The switching signal generation circuit 200 generates a high pulse, for example, if the level of the comparison signal $I_F$ is higher than the level of the summation signal $I_{S0}$, and generates the low pulse in the opposite case.

The DC-DC converter 100 is designed to convert the level of the input voltage $U_E$ to the modified level of the output voltage $U_A$. The level of the output voltage can be above or below the level of the input voltage $U_E$, depending on whether the DC-DC converter is constructed as a boost or a buck converter. By controlling the controllable switch 120 to conduct and to block, the coil 110 is connected at a low impedance or a high impedance, respectively, to the reference voltage terminal M. The controllable switch 120 can be constructed such that a high pulse controls the controllable switch to conduct and a low pulse controls the switch to block.

So that the current $I_L$ flowing through the coil 110 does not exceed a defined value, which could lead to the destruction of the DC-DC converter circuit 100, the switching arrangement in embodiments 1 and 2 has the current limiter 300a or 300b, respectively.

In embodiment 1 of the circuit for DC-DC conversion with current limitation, as shown in FIG. 1, the current limiter 300a has a slope compensation circuit 310a. The slope compensation circuit 310a prevents the appearance of subharmonic oscillations in the duty cycle of the switching signal PWM.

The slope compensation circuit 310a comprises a signal generator 311 for generating a periodic signal $I_{SLOPE}$. The slope compensation circuit 310a further comprises a summation circuit 312a. The summation circuit 312a is coupled on the input side to the signal generator circuit 311 and the DC-DC converter 100. The periodic input signal $I_{SLOPE}$ and the measurement signal $I_{SENSE}$ can be supplied to the summation circuit 312a on the input side. The summation circuit 312a forms a sum from the periodic input signal $I_{SLOPE}$ and the measurement signal $I_{SENSE}$ and, based on the sum, generates a sum signal $I_{S1}$ at the output side.

The current limiter circuit 300a further comprises a correction circuit 320 for evaluating the switching signal PWM. The switching signal PWM can be supplied on the input side to the correction circuit 320. On the output side, the correction circuit 320 generates a correction signal $I_{LC}$.

The current limiter circuit 300a comprises a summation circuit 330 that is connected to the correction circuit 320 and to a terminal for application of a reference signal $I_{LS}$. The correction signal $I_{LC}$ and the reference signal $I_{LS}$ can be supplied on the input side to the summation circuit 330. The reference signal can specify a threshold value of the coil current at which a current limitation is to take place. The summation circuit 330 forms a sum from the level of the reference signal $I_{LS}$ and the level of the correction signal $I_{LC}$ and generates a summation signal $I_{S2}$ on the output side based on the summing.

The current limiter circuit 300a further comprises a comparator circuit 340 for generating the control signal $I_{OC}$. The comparator circuit 340 is connected on the input side to the summation circuit 312a and the summation circuit 330, so that the summation signal $I_{S1}$ and the summation signal $I_{S2}$ can be fed to the comparator circuit 340. The comparator circuit 340 is designed to compare the sum signal $I_{S1}$ to the sum signal $I_{S2}$ and generate a level of the control signal $I_{OC}$ on the basis of the comparison. The comparison circuit can be designed to generate the control signal $I_{OC}$ as a digital signal, for example, with a "0" or "1" level.

FIG. 2 shows an embodiment 2 of the circuit for DC-DC conversion with current limitation with a current limiter 300b different from the current limiter of FIG. 1. The DC-DC converter 100 and the switching signal generation circuit 200 are designed as indicated for embodiment 1 in FIG. 1.

The current limiter 300b comprises a slope compensation circuit 310b with a signal generator circuit 311 and a summation circuit 312b. The summation circuit 312b is connected to the signal generator circuit 311, the correction circuit 320 and the DC-DC converter 100. The signal generator circuit 311 generates a periodic signal $I_{SLOPE}$ that is supplied to the summation circuit 312b at a first input side. At a second input side, the measurement signal $I_{SENSE}$ is supplied to the summation circuit 312b, and the correction signal $I_{LC}$ with a negative sign is supplied to the summation circuit 312b at a third side. The summation circuit 312b is designed to form a sum from a level of the measurement signal $I_{SENSE}$ and a level of the periodic signal $I_{SLOPE}$, and to subtract the correction signal $I_{LC}$ therefrom. The summation circuit 312b generates the sum signal $I'_{S1}$ at the output based on the addition and subtraction.

The current limiter 300b further comprises a comparator circuit 340 to which the sum signal $I'_{S1}$ and a reference signal $I_{LS}$ indicating a threshold value of the coil current can be supplied. The comparator circuit 340 is connected for this purpose on the input side to the summation circuit 312b and to a terminal for the application of the reference signal $I_{LS}$. After a comparison of the level of the sum signal $I'_{S1}$ to the level of the reference signal $I_{LS}$, the comparator circuit 340 generates the control signal $I_{OC}$ at the output side. The level of the control signal $I_{OC}$ is dependent on the comparison of the level of the sum signal $I'_{S1}$ to the level of the reference signal. For example, the control signal can be generated with a level "0" or "1."

In the current limiter circuits 300a, 300b and the respective signal generation circuit 200 of embodiments 1 and of the circuit for DC-DC conversion with current limitation, the signal generator circuit 210 can generate the periodic signal $I_R$ with edges between the individual periods. The signal generator circuits 311a, 311b of the slope compensation circuits 310a, 310b can also generate the periodic signal $I_{SLOPE}$ as a periodic signal with rising or falling edges between successive periods. The signal generator circuits 210 and 311a, 311b can generate a periodic signal with a sawtooth progression, a periodic signal with an exponential progression or a periodic signal with the quadratic progression between successive periods, wherein the level of the signal always falls or rises from period to period from a level not equal to "0" to the "0" level.

The current limiter produces the control signal $I_{OC}$ with a first state, which has the effect that the switching signal generation circuit 200 produces a periodic sequence of a first and a second state, for example a high-level state and a low-level state, of the switching signal PWM, so that the controllable circuit 120 is switched during a period duration of the switching signal from the low-impedance or conductive state to the high-impedance or blocking state if the level of the coil current $I_L$ is below a predefined threshold value $I_{LS}$. Thus the coil 110 is alternately connected with low impedance and high impedance to the reference voltage terminal M.

If the level of the coil current $I_L$ is above a predefined threshold value $I_{LS}$, the control signal $I_{OC}$ can be output by the current limiter 300 with a second state, which has the effect that the switching signal generation circuit 200 produces the switching signal PWM during the entire period duration of the switching signal with the second state, so that the controllable switch 120 is blocked over the entire period duration of the switching signal or even over several period durations of the switching signal. In this case, the coil of the DC-DC converter is disconnected from the reference voltage terminal, i.e. connected at a high impedance to the reference voltage terminal. Consequently, the coil current $I_L$ no longer increases, but is limited to a value.

The correction circuit 320 causes the current limiter 300a, 300b to generate the control signal $I_{OC}$ nearly independently of the magnitude of the duty cycle for the switching signal PWM. If the periodic signal $I_R$ is generated synchronously with the generation of the periodic signal $I_{SLOPE}$, a large duty cycle of the switching signal PWM, which corresponds to a large on-time/off time ratio of the switching signal PWM, has the effect that the periodic signal $I_{SLOPE}$, for example the amplitude of a sawtooth signal, has already increased considerably before a change of state for the switching signal PWM takes place.

If the comparator circuit 340 were to merely compare the sum of the periodic input signal $I_{SLOPE}$ and the measurement signal $I_{SENSE}$ to a constant level of the reference signal $I_{LS}$, then for larger values of the duty cycle, the control signal $I_{OC}$ would already be generated at relatively low levels of the measurement signal $I_{SENSE}$ and thus would be generated even at low levels of the coil current $I_L$ with the second state, which switches the controllable switch 120 into the second state over several periods.

The large increase of the input signal $I_{SLOPE}$ for a large duty cycle of the switching signal PWM can be compensated by means of the correction circuit 320 for generating the correction signal $I_{LC}$. The level of the coil current that causes the current limitation is therefore nearly independent of the duty cycle of the switching signal PWM.

FIG. 3 shows a first embodiment 320a of the correction circuit 320 of FIGS. 1 and 2. The correction circuit has an input terminal E320a for application of the switching signal PWM and an output terminal A320a for outputting the correction signal $I_{LC}$. The correction circuit 320a additionally contains a low-pass filter 10 connected between the input and output terminals. The switching signal applied to the input terminal E320a can be supplied to the low-pass filter 10. The low-pass filter can have, for example, a resistor 11 and a capacitor 12, wherein the resistor 11 is connected between the input terminal and the output terminal, and the capacitor is connected between the resistor and ground. A buffer circuit 30 can optionally be connected between the low-pass filter 10 and the output terminal A320a. A buffer circuit 20 can optionally be connected upstream of the low-pass filter 10. The correction circuit 320a shown in FIG. 3 is designed to determine a mean value of the level of the switching signal PWM over several periods of the switching signal PWM and to provide this as a correction signal $I_{LC}$ at the output terminal A320a.

FIG. 4 shows another embodiment 320b of the correction circuit with an input terminal E320b for application of a periodic signal. A ramp-shaped or sawtooth-shaped input voltage can be applied to the input terminal E320b. For this purpose, the input terminal E320b can be connected to the signal generator circuit 311 for producing the periodic signal $I_{SLOPE}$, if the signal generator circuit 311 generates a periodic voltage. The correction circuit 320b additionally has an input terminal E320b' for application of the switching signal PWM. The correction circuit generates the correction signal $I_{LC}$ at an output terminal A320b. The correction circuit comprises a low-pass filter 10 and a sampling device 40, which is connected between the input terminal E320b and the output terminal A320b. The low-pass filter 10 is arranged between the sampling unit 40 and the output terminal A320b.

The sampling unit 40 is connected between the low-pass filter 10 and the input terminal E320b. The sampling device 40 is designed to sample, at defined times, the periodic signal applied to the input terminal E320b. The sampling times are determined by the switching signal PWM. For example, the periodic signal progression of the input signal can be sampled at every falling edge of the switching signal PWM.

In the embodiment of the correction circuit 320b shown in FIG. 4, a periodic input signal in the form of an input voltage is applied at the input terminal E320b. In contrast to this, a periodic input signal in the form of a current is applied to the input terminal E320c in the embodiment of the correction circuit 320c shown in FIG. 5. The input terminal E320c can be connected, for example, to the signal generator circuit 311 for producing the periodic signal $I_{SLOPE}$, if the signal generator circuit 311 generates a periodic voltage. As in the embodiment shown in FIG. 4, the correction circuit 320c has an additional input terminal E320c' for application of the switching signal PWM. The correction circuit further comprises an output terminal A320c for outputting the correction signal $I_{LC}$.

The correction circuit 320 comprises the low-pass filter 10 and the sampling unit 40, which is connected between the input terminal E320c and the output terminal A320c. The correction circuit 320c additionally has a current/voltage converter 50 and a voltage/current converter 60. The current/voltage converter 50 can be constructed as a resistor that is connected between the input terminal E320c and the sampling unit 40. The current/voltage converter 60 is connected between the low-pass filter 10 and the output terminal A320c. The voltage/current converter comprises a controllable switch 61 and a resistor 62, which are connected between the output terminal A320c and a reference voltage terminal M. A control terminal of the controllable switch 61 is connected to an operational amplifier 63. The non-inverting terminal of the operational amplifier 63 is connected to the low-pass filter 10. The inverting terminal is connected between the controllable switch 61 and the resistor 62. The output terminal A320c of the correction circuit 320c is connected to the controllable switch 61.

In the embodiment 320c of the correction circuit shown in FIG. 5, the periodic input signal $I_{SLOPE}$ can be sampled at sampling times that are defined by the switching signal PWM. The switching signal PWM can be a sequence of square wave signals, for example. The periodic input signal $I_{SLOPE}$ can be sampled when the switching signal has a change of state, for example, a change from a high level to a low level. The sampled input signal $I_{SLOPE}$ is subsequently low-pass filtered. The voltage/current converter 60 generates the correction signal $I_{LC}$ in the form of a current at the output terminal A320c.

FIG. 6 shows an embodiment of a DC-DC converter 100 that is constructed as a buck converter and, upon application of an input voltage $U_E$ at an input terminal E100, generates an output voltage $U_A$ at an output terminal A100. The DC-DC converter 100 can comprise, for example, a current path 101 that is connected between the input terminal E100 for application of a DC voltage and a reference voltage terminal M for application of a reference voltage such as a ground potential.

A controllable switch 120 is connected in series to a diode 140 in the current path 101 between the terminal E100 for application of the input voltage $U_E$ and the reference voltage terminal M. The diode 140 can be embodied as a transistor. The controllable switch 120 can be embodied as a transistor for example. The controllable switch can be switched into a first, low-impedance state, in which the controllable switch is closed, or controlled to conduct, and into a second, high-impedance state, in which the controllable switch is opened or controlled to block.

A control terminal S100 of the DC-DC converter for application of the switching signal PWM for switching the controllable switch 120 into the first and second states is connected via a driver 130 to a control terminal of the controllable switch 120.

The output terminal A100 of the DC-DC converter is connected via a coil 110 to the signal path 101. A capacitor 150 is connected to ground between the coil 110 and the output terminal A100.

LIST OF REFERENCE NUMBERS 1, 2 Embodiments of a circuit for DC-DC conversion with current limitation
10 Low-pass filter
20 Buffer circuit
30 Buffer circuit
40 Sampling unit
50 Current/voltage converter
60 Voltage/current converter
100 DC-DC converter
110 Coil
120 Controllable switch
130 Driver
140 Diode
150 Capacitor
200 Switching signal generation circuit
210 Signal generation circuit
220 Summation circuit
230 Comparator circuit
240 Logic circuit
300 Current limiter
310 Slope compensation circuit
311 Signal generation circuit
312 Summation circuit
320 Correction circuit
330 Summation circuit
340 Comparator circuit
$I_{SENSE}$ Measurement signal
$I_{SLOPE}$ Periodic signal
$I_R$ Periodic signal $I_S$ Sum signal
$I_L$ Coil current
$I_{LC}$ Correction signal
$I_{LS}$ Reference signal
$I_{OC}$ Control signal
PWM Switching signal

We claim:

1. A circuit for DC-DC conversion with current limitation, comprising:
   a DC-DC converter (100) with a coil (110) and a controllable switch (120) that can be switched into a first state and a second state, wherein the controllable switch is higher-impedance in the second state than in the first state;
   a switching signal generation circuit (200) for generating a switching signal (PWM) for switching the controllable switch (120); and
   a current limiter (300a, 300b) for generating a control signal ($I_{OC}$) for controlling the switching signal generation circuit (200),
   wherein the switching signal generation circuit (200) is designed to generate, based on the level of the control signal ($I_{OC}$), a periodic sequence of the switching signal (PWM), which switches the controllable switch into the first and second state during a period duration of the switching signal, or to generate the switching signal (PWM) such that the controllable switch is switched into the second state during the period duration of the switching signal,
   wherein the current limiter (300a, 300b) has a signal generator circuit (311) for generating a periodic signal ($I_{SLOPE}$) and a correction circuit (320, 320a, 320b, 320c) for generating a correction signal ($I_{LC}$),
   wherein a measurement signal ($I_{SENSE}$), the level of which depends on the magnitude of the current ($I_L$) through the coil (110), can be supplied to the current limiter (300a, 300b),
   wherein the current limiter (300a, 300b) is designed to determine a sum of a level ($I_{SLOPE}$) of the periodic signal and a level of the measurement signal ($I_{SENSE}$),
   wherein the correction circuit (320, 320b, 320c) generates the correction signal ($I_{LC}$) based on the periodic signal ($I_{SLOPE}$) and the switching signal (PWM),
   wherein the current limiter (300a, 300b) generates the control signal ($I_{OC}$) based on the correction signal ($I_L$) and the sum,
   wherein the correction circuit (320b) has an input terminal (E320b) for application of the periodic signal ($I_{SLOPE}$) and an output terminal (A320b) for outputting the correction signal ($I_{LC}$), a low-pass filter (10) and a sampling unit (40) for sampling the periodic signal ($I_{SLOPE}$),
   wherein the sampling unit (40) and the low-pass filter (10) are connected between the input terminal (E320b) and the output terminal (A320b),
   wherein the correction circuit (320b) has an additional input terminal (E320b') for application of the switching signal (PWM), and
   wherein the sampling unit (40) is constructed such that the switching signal (PWM) is directly applied to the sampling unit (40) and the sampling times for sampling the periodic input signal ($I_{SLOPE}$) are determined by the switching signal (PWM).

2. The circuit according to claim 1, wherein the current limiter (300a) comprises a summation circuit (312a) for generating a sum signal ($I_{S1}$), and
   wherein the summation circuit (312a) is designed to determine the sum and to generate the sum signal ($I_{S1}$) based on the sum.

3. The circuit according to claim 2, wherein the current limiter (300a) comprises an additional summation circuit (330) for generating an additional sum signal ($I_{S2}$), and
   wherein the additional summation circuit (330) is designed to determine an additional sum from a reference signal ($I_{LS}$) and the correction signal ($I_{LC}$) and to generate the additional sum signal ($I_{S2}$) based on the additional sum.

4. The circuit according to claim 3, wherein the current limiter (300a) comprises a comparator circuit (340) for generating the control signal ($I_{OC}$), and
   wherein the comparator circuit (340) is designed to compare the sum signal ($I_{S1}$) to the additional sum signal ($I_{S2}$) and generate a level of the control signal ($I_{OC}$) based on the comparison.

5. The circuit according to claim 1, wherein the current limiter (310b) comprises a summation circuit (312b) for generating a sum signal ($I_{S1}'$), and
   wherein a summation circuit (312b) is designed to determine an additional sum from the sum and the correction signal ($I_{LC}$) and to generate the sum signal ($I_{S1}'$) based on the sum.

6. The circuit according to claim 5, wherein the current limiter (300b) comprises a comparator circuit (340) for generating the control signal ($I_{OC}$), and
   wherein the comparator circuit (340) is designed to compare the sum signal ($I_{S1}'$) to a reference signal ($I_{LS}$) and generate a control signal ($I_{OC}$) based on the comparison.

7. The circuit according to one of claims 1 to 6, wherein the switching signal generation circuit (200) is designed as a pulse width modulator that generates the switching signal (PWM) as a pulse-width modulated signal.

8. The circuit according to claim 1, wherein the correction circuit (320, 320a, 320b, 320c) is designed to determine a mean value of the level of the switching signal (PWM) or of a level of the periodic signal ($I_{SLOPE}$).

9. The circuit according to claim 1, wherein the signal generator (311) generates the periodic signal ($I_{SLOPE}$) with a rising or falling edge when changing from one period to a subsequent period.

10. The circuit according to claim 9, wherein the signal generator (311) generates a signal with a sawtooth progression, a signal with an exponential progression or a signal with a quadratic progression.

11. The circuit according to claim 1, wherein the DC-DC converter (100) is constructed as a boost converter or a buck converter.

* * * * *